Sept. 25, 1962  H. W. ASCHINGER  3,055,667
SEAL ASSEMBLY FOR ROTARY SHAFT
Filed Aug. 11, 1959

INVENTOR.
Harold W. Aschinger
BY

United States Patent Office 3,055,667
Patented Sept. 25, 1962

3,055,667
SEAL ASSEMBLY FOR ROTARY SHAFT
Harold W. Aschinger, Ridgefield, N.J., assignor, by mesne assignments, to Vare Industries, Roselle, N.J., a corporation of New Jersey
Filed Aug. 11, 1959, Ser. No. 832,998
6 Claims. (Cl. 277—95)

The present invention deals with a seal assembly for a rotary shaft and more particularly with a seal assembly applicable as a transition means for a shaft passing from one medium into another through a wall separating the mediums.

Figure 1:
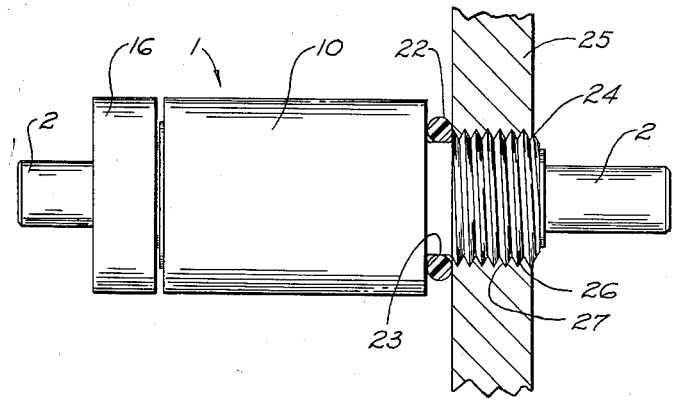
Figure 2:
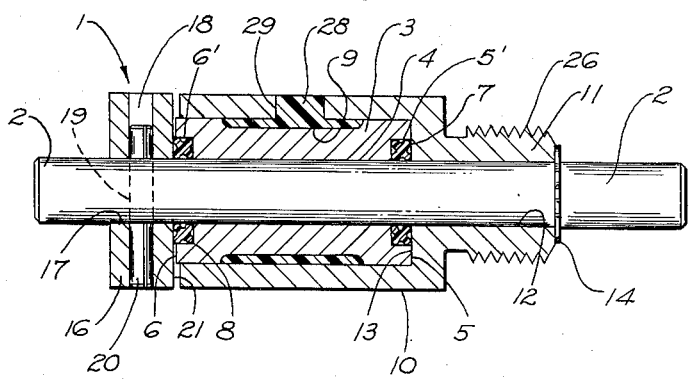

It is an object of the invention to provide a fluid-tight or gas tight seal assembly for a rotary shaft passing through the wall of a container and connected on one side of the wall to a motor drive means and on the other side of the wall to a working means. It is another object of the invention to provide a seal assembly for rotary shafts passing through a wall of a submerged chamber. It is a further object of the invention to provide a seal assembly for rotary shafts passing through the wall of a sealed chamber containing a medium at a pressure higher or lower than the medium surrounding the chamber. Other objects and advantages will become apparent from the description hereinafter following and the drawings forming a part hereof in which:

FIGURE 1 illustrates primarily an elevational side view and a partly cross-sectional view of the seal assembly according to the invention, and FIGURE 2 illustrates a cross-section view of the seal assembly of the invention.

The invention deals with a seal assembly for rotary shafts including means for assuring a fluid-tight shaft seal under conditions of substantially high fluid pressures, e.g. high water pressures.

Regarding the illustration, the seal assembly 1 comprises a rotatable shaft 2 with an elongated sleeve 3 mounted thereon. The sleeve 3 has an axial bore 4 formed therethrough with the shaft 2 passing through the bore and rotatable therein. Both ends of the sleeve 3 are provided with flat surfaces 5 and 6 normal to the shaft axis with an annular recess 5' and 6' in the flat ends and adjacent to and communicating with the bore 4 at each end of the sleeve. Deformable elastic rings 7 and 8 are positioned one each in the recesses 5 and 6. The elastic rings are composed of either an elastic plastic material, natural rubber, or synthetic rubber, and may have cross-sections in the form of an O-ring, but preferably they are in the form of rings having coaxial annular recesses and projections defining a non-circular ring cross-section, e.g. a cross-section such as that of a quad ring. The elastic rings 7 and 8 are dimensioned to fit into the annular recesses and around the shaft 2 with portions of the rings normally extending outwardly of the recess so that when the unit is assembled, as hereinafter more particularly described, the elastic rings are always under at least some mechanical compression. The sleeve 3 is further provided with a substantially wide circumferential groove 9 between the ends thereof. A coaxial housing 10 is mounted over the sleeve 3 and is provided with a coaxial threaded stud 11 extending from one end thereof and having a bore 12 formed therethrough with the shaft 2 passing through and being rotatable in the bore 12. The housing cavity is provided with a flat-faced abutment surface 13 internally thereof and contactable with one end face 5 of the sleeve 3, the elastic ring 7 being under at least some mechanical compression when the faces 5 and 13 are in contact with each other and providing a secondary seal means. The shaft 2 is provided with an annular recess (not shown) receptive to a snap-ring 14 for retaining the housing 10 on shaft 2. The housing comprises a collar 16 having a coaxial bore 17 centrally therethrough is mounted on the shaft 2 with the shaft passing through the bore 17. The collar 16 has a diametrical hole 18 drilled therethrough, and shaft 2 is provided with a hole 19 through its diameter. When the collar and shaft holes are in alignment, a roll pin 20 is positioned into the aligned holes for retaining the collar on the shaft. When the roll pin is in position, a flat-face 21 of the collar normal to the collar axis is in abutment with the face 6 of sleeve 3 and subjecting the elastic ring 8 to at least some mechanical compression and providing a primary seal means.

When the housing 10 and its collar 16 are in secured position, elastic sealing material 28, e.g. an epoxy resin, is admitted through a hole 29 through the wall of housing 10, the hole 29 communicating with the groove 9 of sleeve 3, whereby at least the groove 9 is effectively filled with the sealing material which is subsequently cured and prevents any leakage through the housing 10 and whereby any leakage possible through one ring 8 along the shaft 2 is effectively corrected by the secondary seal 7. Alternatively, the sealing material may be an elastic ring, e.g. a rubber ring.

With at least the primary seal means comprising a deformable ring 8, any fluid under pressure which contacts the elastic ring 8 through a passage between the collar and housing 10 exerts pressure against the ring 8 forcing it to deform within the recess 6' with sealing pressures against the shaft 2 being directly proportional to the fluid pressures. Consequently, the primary seal means hereinbefore referred to provides for dynamic sealing in accordance with fluid pressures.

Having assembled the seal assembly, an elastic O-ring 22 is positioned over a neck 23 on stud 11 adjacent the housing 10, and the stud 11 is screwed into an aperture 24 of a container wall 25 with the threads 26 of the stud mating the internal threads 27 of the wall aperture and the O-ring 22 effectively sealing the threaded connection.

Various modifications of the invention are contemplated within the scope of the appended claims.

What is claimed is:

1. A seal assembly for a rotary shaft comprising a shaft, an axially-bored journal sleeve mounted on the shaft, annular counterbore recesses in both ends of the sleeve communicating with the sleeve bore, elastic deformable rings fitted into the recesses, a coaxial housing mounted over and containing the sleeve, an annular groove in the sleeve between the sleeve and housing, sealing material filling the groove, the shaft being journalled in one end of the housing, coaxial collar means fixed to the shaft and contacting one of said deformable rings, means for permitting fluid contact with the elastic ring between the collar and sleeve, whereby the ring is deformable in accordance with the fluid pressure.

2. A seal assembly according to claim 1, wherein the sealing material is a plastic material.

3. A seal assembly according to claim 1, wherein the sealing material is an elastic rubber ring.

4. A seal assembly according to claim 1, comprising an aperture through the wall of the housing, whereby the sealing material is subject to external pressures.

5. A seal assembly according to claim 1, comprising a stud extending axially of the housing and in which the shaft is journalled.

6. A seal assembly according to claim 1, comprising means for retaining the housing against axial movement relative to the shaft.

References Cited in the file of this patent

UNITED STATES PATENTS

| | | |
|---|---|---|
| 2,712,461 | Batchelder | July 5, 1955 |
| 2,723,868 | Hartranft | Nov. 15, 1955 |
| 2,841,422 | Badger | July 1, 1958 |
| 2,959,433 | Hill | Nov. 8, 1960 |